United States Patent [19]

Hough

[11] Patent Number: 5,127,483

[45] Date of Patent: Jul. 7, 1992

[54] MICRO WEIGHING SYSTEM

[75] Inventor: Richard M. Hough, Lansing, Mich.

[73] Assignee: Hough International, Inc., Albertville, Ala.

[21] Appl. No.: 649,753

[22] Filed: Feb. 1, 1991

[51] Int. Cl.⁵ .................... G01G 19/22; G01G 13/18; G01G 21/22

[52] U.S. Cl. ...................................... 177/70; 177/105; 177/263

[58] Field of Search .................... 177/59, 70, 105–121, 177/263, 262

[56] References Cited

U.S. PATENT DOCUMENTS

| 2,936,994 | 5/1960 | Lau | 177/105 |
| 4,809,795 | 3/1989 | Neumann | 177/59 |
| 4,874,048 | 10/1989 | Kawanishi et al. | 177/108 X |

FOREIGN PATENT DOCUMENTS

| 0611654 | 1/1961 | Canada | 177/262 |

Primary Examiner—George H. Miller, Jr.
Attorney, Agent, or Firm—Price, Heneveld, Cooper, DeWitt & Litton

[57] ABSTRACT

A weighing apparatus having a plurality of removable ingredient retention and discharge hoppers supported on a frame, each hopper having an integral screw conveyor and each being removable for replacement by another hopper. The screw has a structure to inhibit discharge squirting. Dishcarge of the ingredients is through a sealed connection to a weighing hopper. This weighing hopper has an enclosure housing and is formed of a pair of flexible webs which extend downwardly and are shiftable between a closed retention condition with lower edges adjacent each other and an open discharge condition with the lower edges spaced from each other. These lower edges are secured to the inner edges of underlying pivotal support pans, such pans being pivotal to shift the webs and to engage the webs to invert them for assured full discharge of the contents.

7 Claims, 4 Drawing Sheets

5,127,483

MICRO WEIGHING SYSTEM

BACKGROUND OF THE INVENTION

This invention relates to a weighing system, especially a weighing system for small quantities of materials such as vitamins, minerals and drugs.

Apparatus for weighing small quantities of materials presently involves use of a plurality of fixed material containing bins having screw conveyors to advance ingredients from the bins to a weighing U-shaped container or tub. After the desired amount of ingredients is placed in the tub, the tub is inverted to dump it. This system has problems, however.

Specifically, firstly the materials sometimes bridge above and around the conveyor screw so as not to be dispensed as needed. Secondly, the materials, after becoming aerated, sometimes "squirt" out of the discharge end of the screw conveyor rather than flowing smoothly. Thirdly, after the needed quantity of valuable ingredients has been discharged from the individual hopper, some still remains in the hopper and conveyor and must be retrieved somehow before a new ingredient is placed in the hopper. Fourthly, after the ingredients are placed in the weighing tub and the tub is inverted, some ingredients tend to stick to the tub and remain in it, to cause the weighed material to be lacking in that ingredient, and to possibly cause contamination of subsequently weighed ingredients.

SUMMARY OF THE INVENTION

One object of this invention is to provide a unique weighing system, especially useful for small quantities of ingredients such as vitamins, minerals and drugs. The individual ones of a plurality of supply and discharge bins are independently removable and replaceable with other bins. Each bin has its own screw conveyor for discharge thereof. Hence, the remaining valuable ingredients in the bin and conveyor need not be removed from the bin and conveyor but rather can be stored separately, enabling another ingredient in its special bin and conveyor to be dispensed. It can also be hoisted and weighed for inventory control. The screw conveyor has increasing spacing between flights toward the discharge end, and preferably a double helix at the discharge region, preventing the ingredient from squirting out at the discharge due to product aeration or the like. Rollers riding the screw conveyors inhibit bridging around the conveyor. The weighing hopper into which the ingredients are discharged from the screw conveyors has a unique construction employing a pair of elongated flexible webs having flipper type pans therebeneath. The webs receive the ingredients from the various hoppers. The lower edge of the flexible webs is attached to the inner edge of the pans. The pans pivot between an open discharge position and a closed receiving position. At this closed position, two edges of the pans resiliently engage each other to assure closure. In the open position, the flex webs are engaged and reshaped temporarily by the pans, to assure full discharge.

These and other objects and advantages and features of the invention will become apparent upon studying the following specification in conjunction with the drawings.

DESCRIPTION OF THE PREFERRED EMBODIMENT

Figure 3:
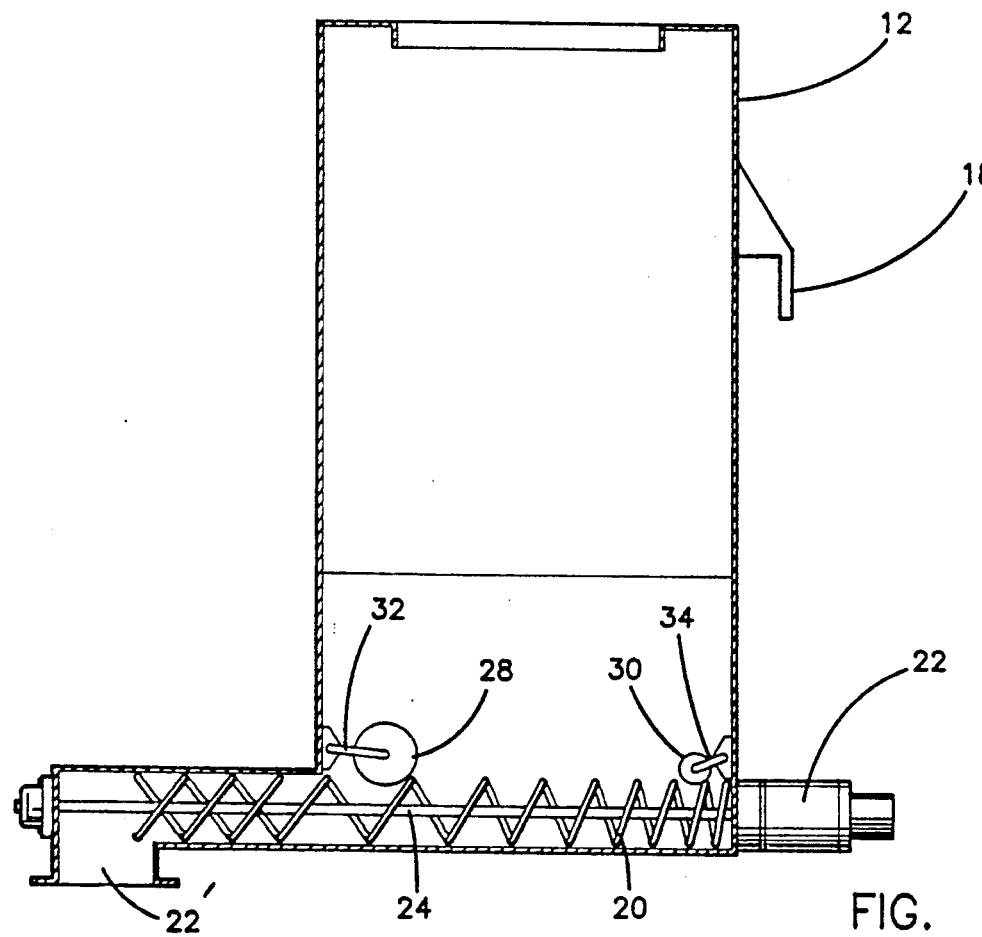
FIG. 3 is a sectional view of one of the ingredient hoppers of FIGS. 1 and 2.

Referring now specifically to the drawings, the apparatus 10 is shown to include a plurality of adjacent ingredient hoppers 12 here shown to be positioned in two groups opposite each other in alternate staggered relationship. Both groups have their discharge outlets 22 centrally of the two groups. The hoppers are supported on a framework 14. Each bin has its generally V-shaped lower end portion resting in a like generally V-shaped saddle 15 (FIG. 4), and has a downwardly oriented hook 18 on the inner end of the hopper connected to a bracket 16 on the frame. Integral with the bottom of each bin is a discharge screw conveyor 20 (FIG. 3) operated by a motor 22, preferably a hydraulic motor. The V-shaped bottom portion of bin 12 thus tapers down to the cylindrical base thereof which contains the conveyor screw 20. This conveyor screw is shown to have an increasing spacing between flights toward the discharge end, with the last portion being a double helix immediately adjacent discharge 22. This structure is to prevent the materials from "squirting" out of the bin when they become aerated by action of the screw. The conveyor screw may be formed of a helical rod attached to central shaft 24 of the conveyor by suitable radial supports (not shown). Bridging of the material in the bin around conveyor screw 20 is inhibited by rollers 28 and 30 mounted on pivot rods 32 and 34 respectively to the sides of hopper 12 (FIG. 3). These rollers are biased by gravity toward the screw, and ride over and bump down against the successive convolutions of the screw to knock material loose that may otherwise tend to hang up.

Figures 4, 5:
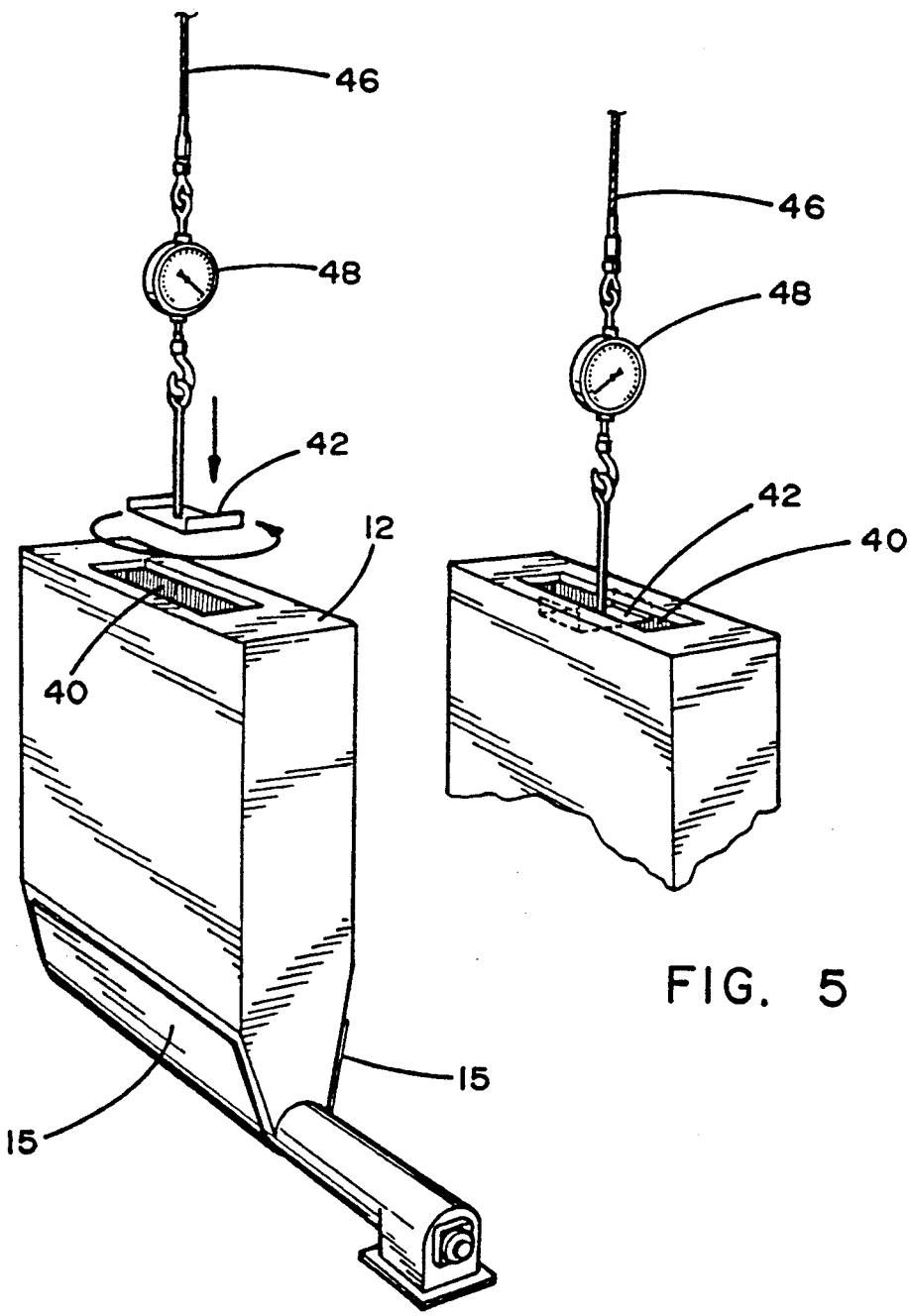
FIG. 4 is a perspective view of the hopper in FIG. 3.
FIG. 5 is a fragmentary perspective view of the hopper in FIG. 4, along with a lifting mechanism and scale.

The plurality of bins, here shown to be fifteen in number, may have a variety of sizes to accommodate the particular ingredients being handled. Each bin thus has its own conveyor unit to be generally self contained. Preferably, removal of a bin and substitution of another bin is with a mechanism like that shown in FIGS. 4 and 5. More specifically, the top of each bin 12 has an opening 40 to enable an elongated lift plate 42 to be inserted therein. The opening 40 is longer in one dimension than in the second dimension (FIGS. 4 and 5). The lift plate 42 has a width smaller than the width of opening 40 but a length greater than the width of opening 40. Thus, by lowering plate 42 into opening 40 while the long dimension of plate 42 is aligned with the long dimension of opening 40, and then rotating the plate 90 degrees, the ends of the plate will engage under the flanges adjacent the width of opening 40. The hopper can then be lifted by a suitable power hoist (not shown) attached to lift cable 46, to lift the bin for placement on the assembly 10, or removal therefrom, or to weigh the unit. Preferably the lifting cable may include a weighing scale 48 so that the weight of ingredients in the bin can be determined at any time. This enables accurate inventory control.

Figure 6:
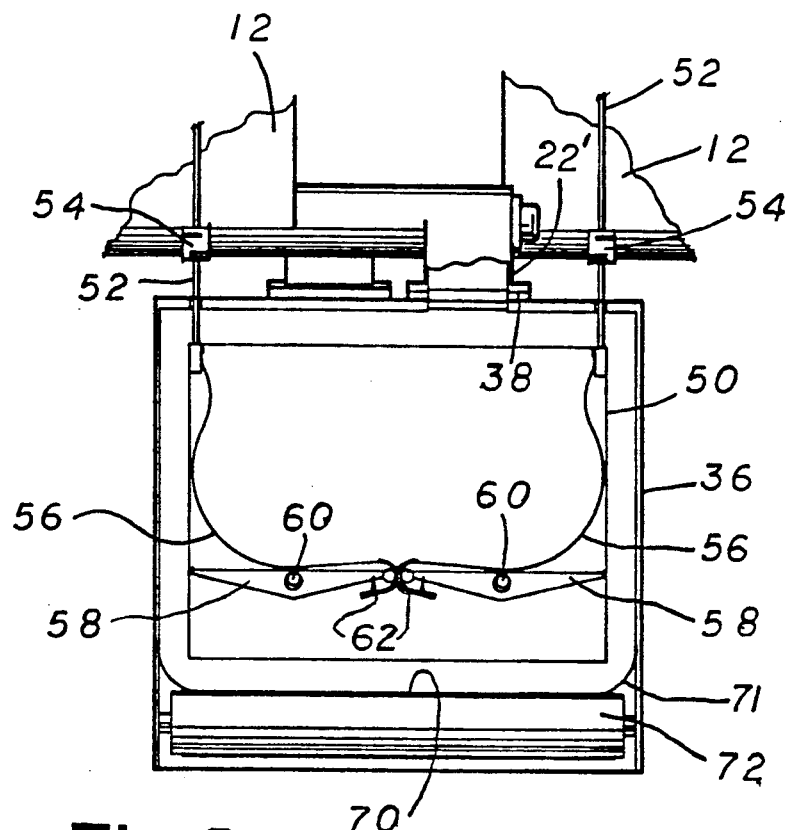
FIG. 6 is a fragmentary elevational view of the weigh hopper of the system with the elements shown in closed condition.
Figure 7:
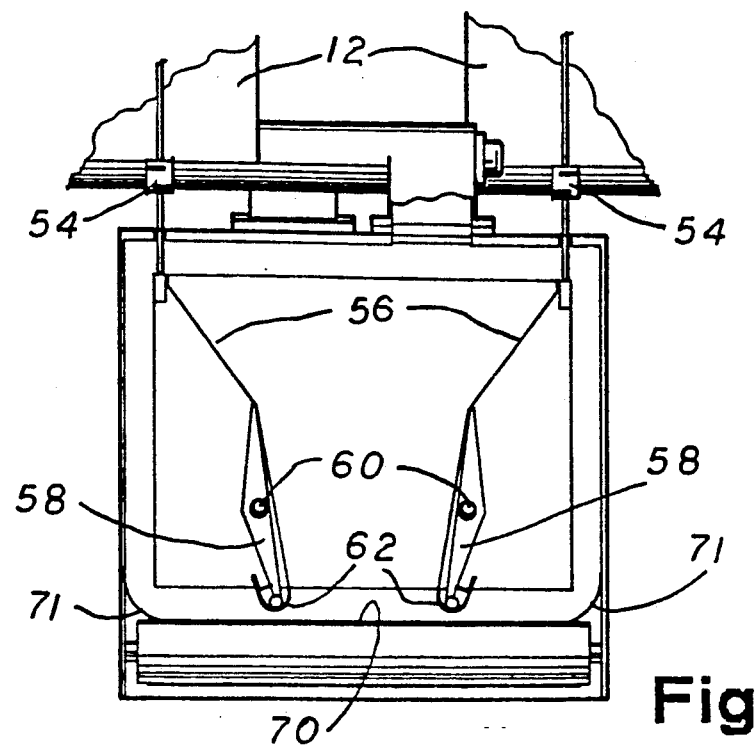
FIG. 7 is a fragmentary elevational view of the weigh hopper in FIG. 6, showing the elements in open condition.

Beneath the series of discharge outlets from the plurality of bins is a horizontally elongated housing 36 which contains the weigh hopper and a discharge conveyor belt or the equivalent. Housing 36 prevents dust from disseminating into the room, and also prevents air drafts from upsetting the weighing process. Between the discharge end 22 of each bin and the horizontally elongated housing 36 is a gasket 38 to seal this connection. Within housing 36 is a weigh hopper 50 (FIG. 6). More specifically, this weigh hopper is supported on its four corners by a plurality of tension supports or cables 52 which include load cells 54 for indicating the load applied to the weigh hopper. This weigh hopper includes a pair of elongated flexible webs 56 attached at their upper edges to the weigh hopper frame, and extending downwardly and then inwardly toward each other where they engage each other when the hopper is closed, to retain the ingredients thereon. These flexible webs may be of a woven material, preferably having the inner faces covered by a lubricious polymeric coating such as polytetrafluroethylene. The lower inner edges thereof are secured to the inner edges of a pair of generally triangularly shaped pivotal support pans 58 which extend beneath the webs, and each of which is mounted intermediate its elongated edges on a pivot rod 60. The inner edges of the pans, which are adjacent each other in the closed position, include a length of flexible polymer, preferably foam polymer, 62 so that when the hopper is closed, the two press against each other to seal off the discharge. These pans are pivotal about shafts 60 when actuated as by a fluid cylinder or the equivalent (not shown) through linkage (not shown) to pivot from the horizontal condition shown in FIG. 6 to the vertical condition shown in FIG. 7. When so pivoted, the inner edges of the pans, and thus the attached lower inner edges of the webs, shift downwardly and outwardly away from each other. The outer edges of the pans rotate upwardly and inwardly, engaging the outer faces of webs 56 intermediate the upper web portion and the lower web edge, to force these flexible webs toward each other, thereby inverting them and changing their configuration, to assure full dumping of the contents.

Figure 1:
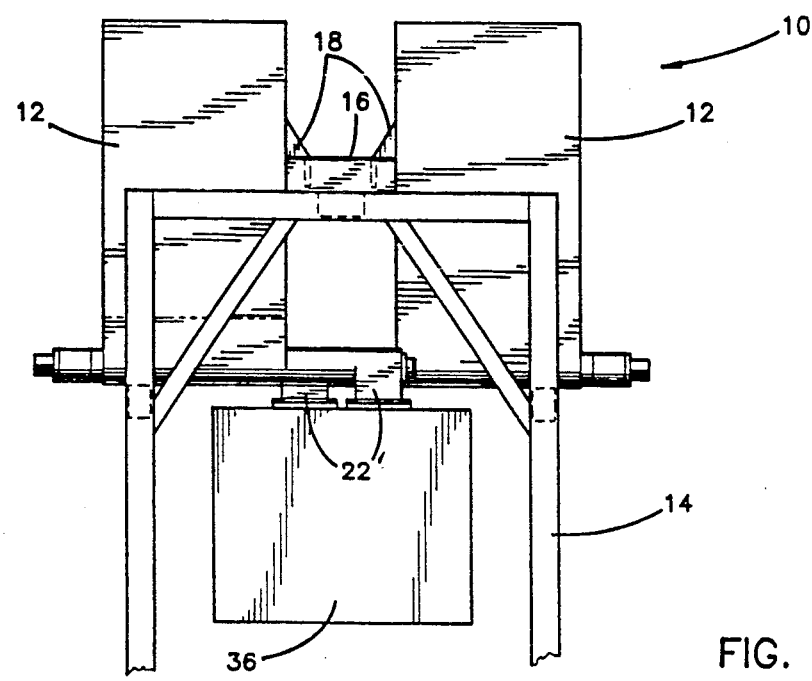
FIG. 1 is an end elevational view of the novel system.
Figure 2:
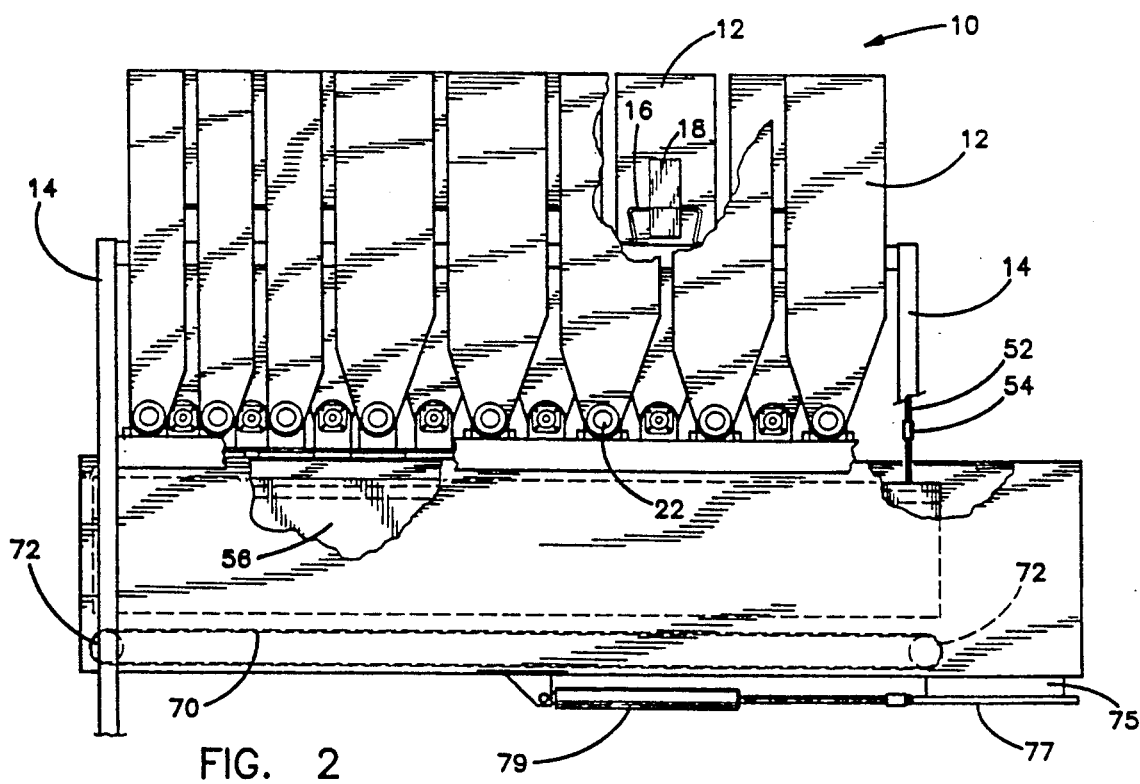
FIG. 2 is a side elevational view of the system in FIG. 1.

Beneath this weigh hopper is a transfer mechanism such as a belt conveyor 70 which travels around suitable rollers 72 to transfer the weighed ingredients to a desired location. The belt 70 transfers the ingredients to a discharge outlet 75 (FIG. 2), the closure 77 of which is operated by fluid cylinder 79.

Figure 8:
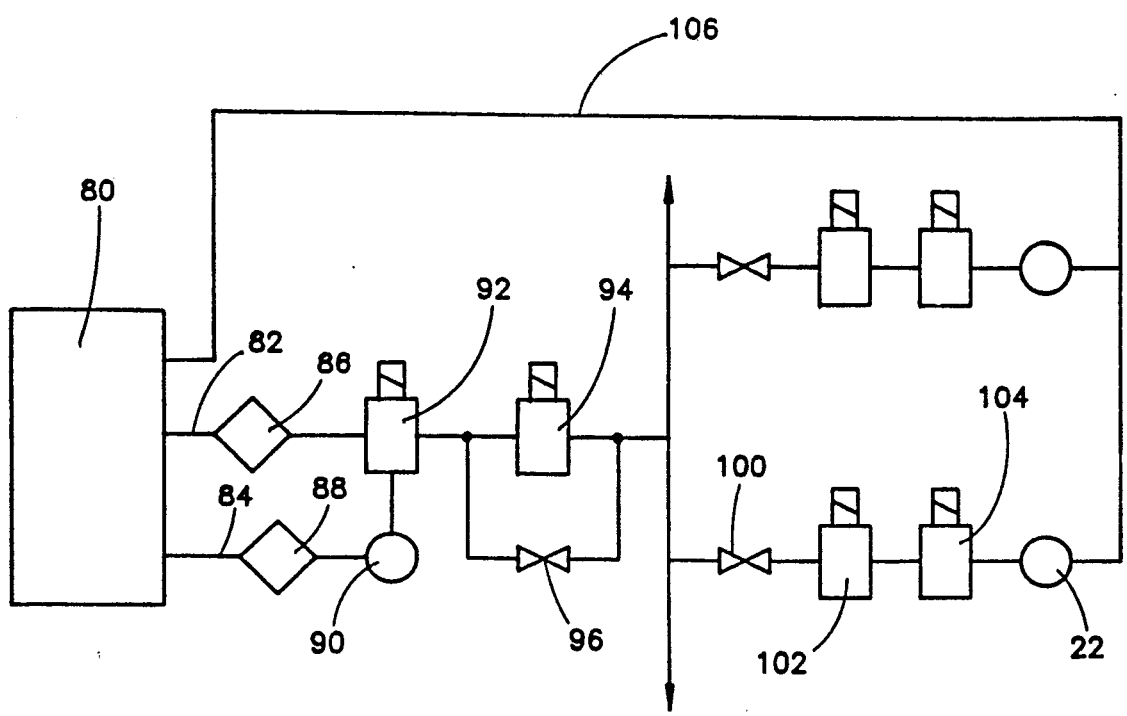
FIG. 8 is a schematic view of an operational hydraulic circuit for the system.

In FIG. 8 is depicted a hydraulic system for control of the several screw conveyors in the respective hoppers. The fluid supply tank 80 provides hydraulic fluid through line 84 and filter 88 as propelled by variable displacement constant pressure pump 90. When no ingredients are to be dispensed, fluid from pump 90 bypasses through valve 92 and filter 86 back to the supply tank through line 82. When ingredients are to be dispensed, power loading and relief valve 92 shifts to close the return line and allow flow to a split stream path, one stream being controlled by electromagnetic valve 94 and the other stream controlled by a manual flow control valve 96. From thence the hydraulic fluid passes to any of several hydraulic motor circuits, two of which are shown. Specifically, each circuit includes a manual flow control valve 100, a pair of electromagnetically operated shutoff valves 102 and 104, and the hydraulic motor, e.g., 22, for the particular hopper being served. A return line 106 conducts fluid back to tank 80.

Discharge of ingredients from the individual hoppers is preferably specially controlled by these hydraulic motors for accurate weighing of ingredients to a precise formula. During most of the filling operation, electromagnetic valve 94 and manual valve 96 are open to allow the pressurized fluid to flow through both to motor 22. When a preset percentage of the weight, e.g., 80% of target weight, is reached, valve 94 closes, causing fluid to flow only through valve 96 which can be manually preset to a desired rate, causing motor 22 to turn more slowly to cause a slower discharge rate to the weigh hopper. With a slower feed rate, the scale can weigh more accurately. When the target weight is reached, valves 102 and 104 close to stop the motor and thus stop the feed The process is repeated for successive ingredient hoppers until the total desired weight of all ingredients is reached In operation, therefore, the individual ingredient hoppers are hoisted into their respective V-shaped saddles, the upper hooks 18 being attached to brackets 16. The individual motors 22 are hydraulically connected and operated to discharge ingredients into the weigh chamber 50 within housing 36. As each ingredient is discharged into the weighing hopper, the rate of feed thereof to the weigh hopper decreases at approximately 80% of the desired weight level as explained above. Ultimately, when all of the ingredients are dispensed into the chamber formed by elongated webs 56, and the total weight is achieved as measured by load cells 54, the combined load is dumped onto underlying belt conveyor 70, with spillage along both ends of the conveyor rollers 72 being prevented as by rubber guards 71 (FIG. 6). This dumping is achieved by pivoting of elongated pans 58 underlying flexible webs 56, causing the outer edges of the pans to engage and invert the webs and thereby change their configuration from a retention to a discharge condition. When the pans are again rotated back to the closed condition, the flexible elements 62 at the inner edges of the pans and webs compress against each other to close off the discharge. The unit is then ready for the next weighing operation.

It is conceivable that certain modifications of this apparatus may be achieved without departing from the concept presented Therefore, the invention is not intended to be limited to the specific preferred embodiment set forth, but only by the appended claims and the reasonable equivalents thereto.

The embodiments of the invention in which an exclusive property or privilege is claimed are defined as follows.

1. A weighing system comprising:
ingredient hopper means for retaining individual ingredients to be weighed;
a weigh hopper for receiving ingredients from said ingredient hopper means;
means for weighing ingredients in said weigh hopper;
said weigh hopper comprising a pair of flexible webs, each having an upper portion and a lower edge;
means for supporting said upper portions; and
a pair of lower supports attached to said lower edges, and shiftable between a first position adjacent each other to cause said webs to form a closed receptacle and a second position spaced from each other to open said receptacle.

2. The weighing system in claim 1 wherein said webs have an inner face and an outer face, and said lower supports include web engagers positioned and shiftable to engage said web outer faces for reshaping said webs to assure dumping of the contents therein.

3. The weighing system in claim 2 wherein said lower supports and web engagers are pivoted to shift.

4. The weighing system in claim 2 wherein said webs include a polymeric coating on said inner faces.

5. The weighing system in claim 2 wherein said web engagers comprise outer edges of said lower supports.

6. The weighing system in claim 1 including resilient, elongated means at said lower edges for engaging each other to close said receptacle when said supports are in said fist position.

7. The weighing system in claim 5 wherein said lower support outer edges engage said web outer faces intermediate said web upper potions and said web lower edges, to deflect said webs to an inverted condition when said lower supports are pivoted.

* * * * *

UNITED STATES PATENT AND TRADEMARK OFFICE
CERTIFICATE OF CORRECTION

PATENT NO. : 5,127,483
DATED : July 7, 1992
INVENTOR(S) : Richard M. Hough

It is certified that error appears in the above-identified patent and that said Letters Patent is hereby corrected as shown below:

On the title page, item [57]:
In the Abstract, line 6;
      "Dishcarge" should be -- Discharge --;

Column 2, line 38;
      "22" should be -- 22' --;

Column 3, line 13;
      "22" should be -- 22' --;

Column 4, line 20;
      After "feed" insert -- . --;

Column 4, line 22;
      After "reached" insert -- . --;

Column 4, line 49;
      After "presented" insert -- . --;

Column 6, line 6;
      "fist" should be -- first --;

Column 6, line 9;
      "potions" should be -- portions --.

Signed and Sealed this

Thirtieth Day of November, 1993

Attest:

BRUCE LEHMAN

Attesting Officer          Commissioner of Patents and Trademarks